Feb. 13, 1962 G. N. HOWATT 3,021,441

PIEZOELECTRIC TRANSDUCER

Filed Dec. 26, 1957 3 Sheets-Sheet 1

INVENTOR
GLENN N. HOWATT
BY Martha G. Pugh
AGENT

INVENTOR
GLENN N. HOWATT
BY Martha G. Pugh
AGENT

INVENTOR
GLENN N. HOWATT
BY Martha G. Pugh
AGENT

United States Patent Office 3,021,441
Patented Feb. 13, 1962

3,021,441

PIEZOELECTRIC TRANSDUCER

Glenn N. Howatt, Metuchen, N.J., assignor to Gulton Industries, Inc.

Filed Dec. 26, 1957, Ser. No. 705,452
14 Claims. (Cl. 310—8)

This application is a continuation-in-part of my application Serial Number 698,449, filed November 25, 1957, now abandoned.

This invention relates in general to electric circuit elements composed essentially of high dielectric crystalline materials, and, more particularly, to electrocoustic transducers comprising as their active elements ceramic bodies of piezoelectric and ferroelectric crystalline material.

It has been found in the prior art that transducer elements comprising piezoelectric crystalline materials which include a high proportion of lead titanate and lead zirconate have a number of advantages over barium titanate transducers, in that they are operative at higher temperatures, and have more uniform characteristics over a wide temperature range.

However, in the preparation of ceramic transducer elements which comprise a substantial proportion of lead oxide, for various piezoelectric and ferroelectric applications, a problem is created by the volatilization of lead oxide at temperatures which are below the firing temperatures necessary to properly mature the ceramic bodies. This is readily apparent from the following table which gives the vapor pressures of lead oxide over the usual range of firing temperatures for these compositions.

*Table 1*

| Vapor pressures of lead oxide (millimeters of mercury) | Temperature (degrees centigrade) |
|---|---|
| 1 | 943 |
| 10 | 1,085 |
| 40 | 1,189 |
| 100 | 1,265 |

Thus, it is apparent that at the firing temperature of ceramic bodies of the aforesaid type including a large proportion of lead oxide, which is 1204 degrees centigrade, the vapor pressure, interpolating from the data given in the above table, is about 80 millimeters of mercury.

It is a general object of the present invention to provide improvements in ceramic elements comprising dielectric crystalline materials, and more specifically, in piezoelectric and ferroelectric transducers which include ceramic bodies as their active elements.

A more particular object of the present invention is to provide piezoelectric and/or ferroelectric crystalline ceramic bodies comprising a substantial proportion of lead oxide, in which the tendency of the latter component to volatilize at temperatures within the range of the firing or maturing temperatures of the ceramic is substantially reduced.

These and other objects are realized in accordance with the present invention in an electrical transducer in which the active element comprises a ceramic crystalline body consisting essentially of lead oxide and one or more of the compounds, titania and zirconia, in which a substantial amount of the lead oxide is replaced by lead fluoride.

Figure 1:
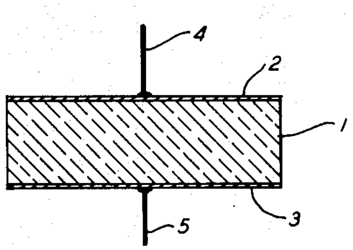
Figure 2:
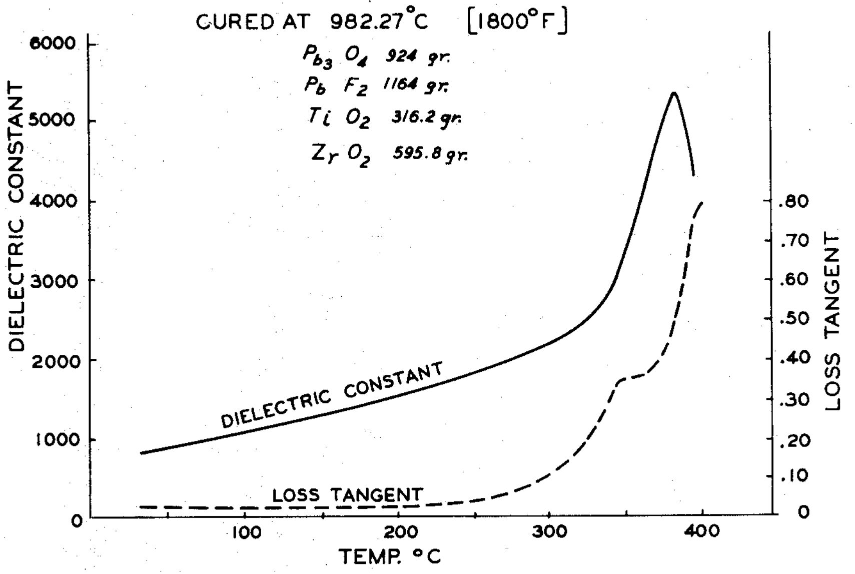
Figure 3:
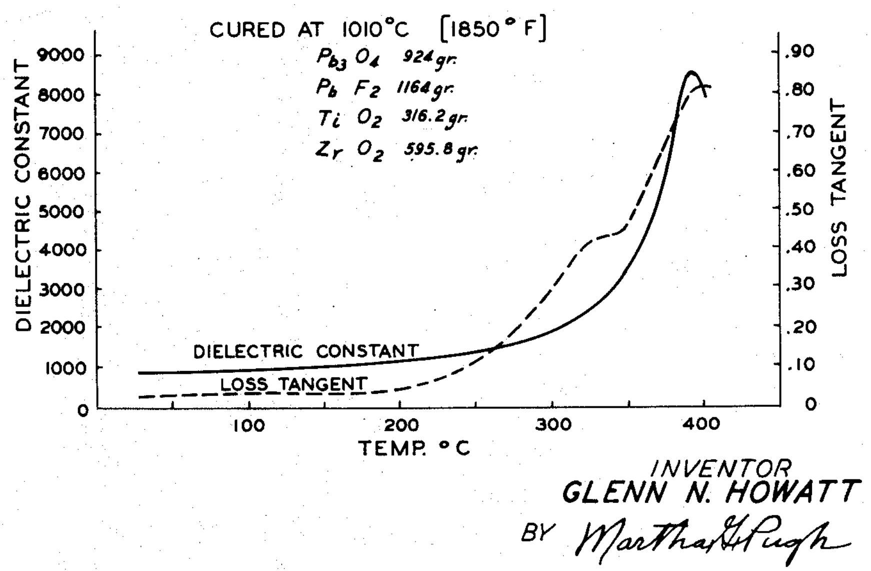
Figure 4:
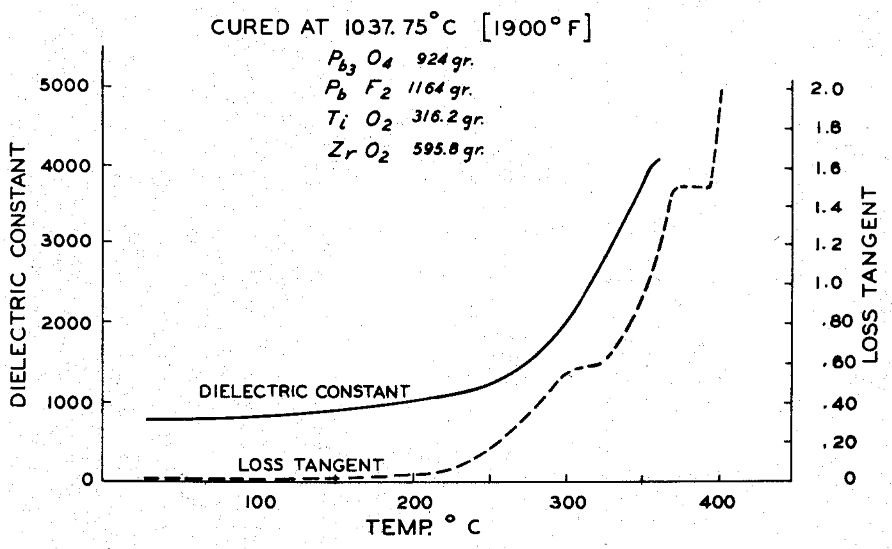
Figure 5:
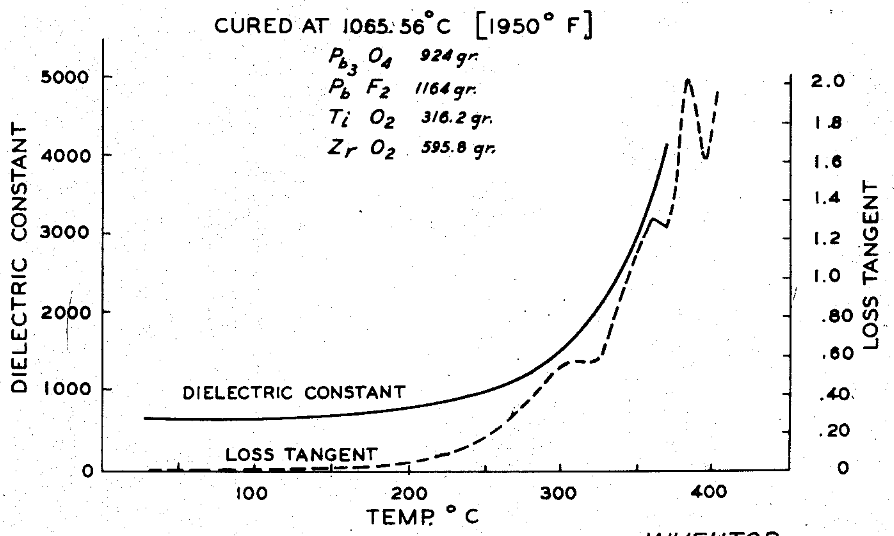
Figure 6:
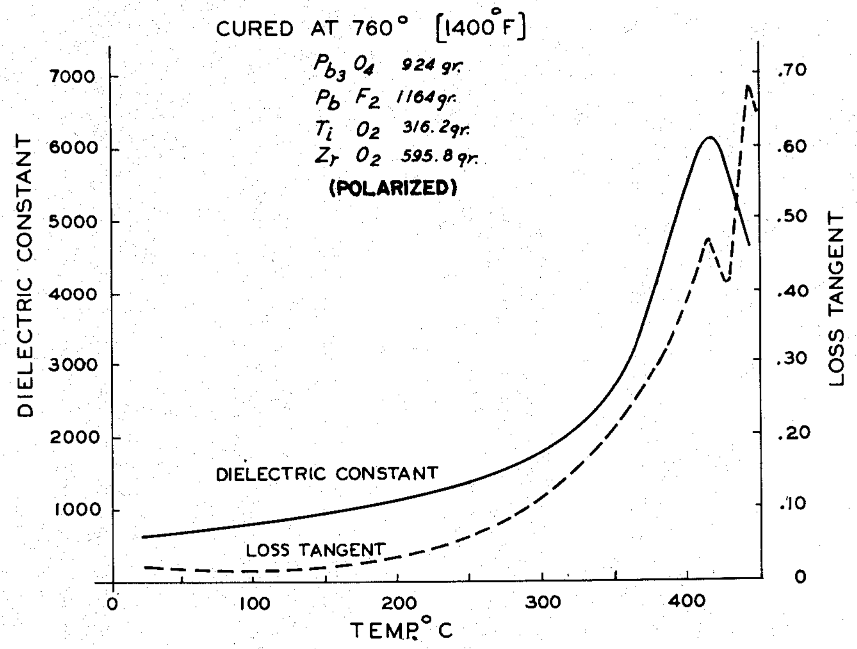
Figure 7:
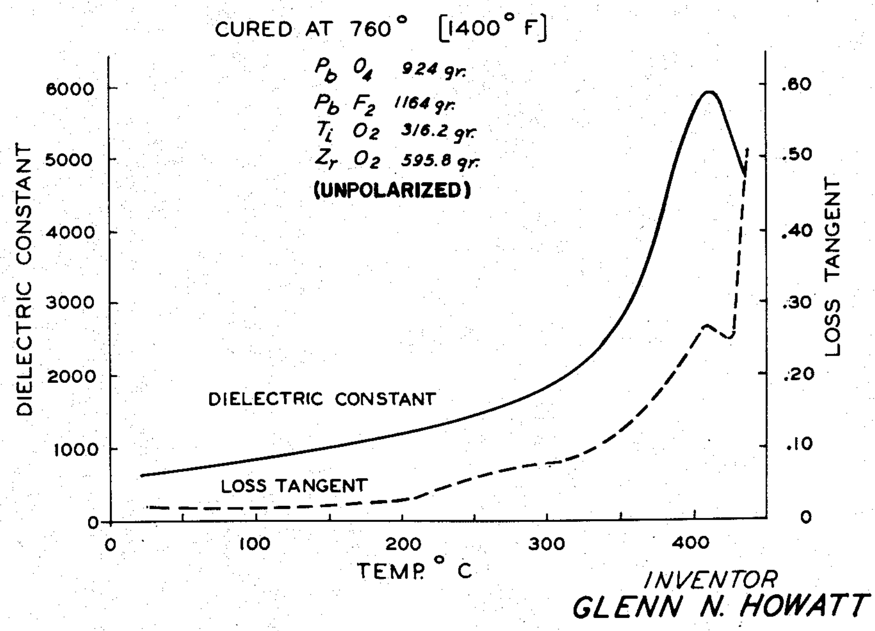

The preparation and specific characteristics at different firing temperatures of the ceramic bodies contemplated in accordance with the present invention will be described in detail in the specification hereinafter, with reference to the attached drawings in which:

FIGURE 1 is a showing, in cross-section, of an electrical transducer in accordance with the present invention; and FIGURES 2, 3, 4, 5, 6 and 7 are characteristic curves showing the temperature variations of the dielectric constant, and the loss angle for ceramic bodies of a particular preferred composition in accordance with the present invention, cured at six respectively different temperatures.

Referring specifically to the drawings, the electroacoustic transducer shown in FIGURE 1 comprises an electrically polarized body 1 of crystalline dielectric material consisting essentially of a solid solution of a lead oxide, lead fluoride $PbF_2$, titanium dioxide $TiO_2$, and zirconium dioxide, $ZrO_2$.

The following are preferred examples of mixes employed to form the solid solution of the present invention:

MIX I

| | Weight, grams | Mole percent |
|---|---|---|
| $Pb_3O_4$ | 924 | 9.1 |
| $PbF_2$ | 1,164 | 31.9 |
| $TiO_2$ | 316.2 | 26.6 |
| $ZrO_2$ | 595.8 | 32.4 |
| Total | 3,000.0 | 100.0 |

MIX II

| | Weight, grams | Mole percent |
|---|---|---|
| PbO | 909.0 | 23.0 |
| $PbF_2$ | 1,173.0 | 27.0 |
| $TiO_2$ | 318.0 | 22.5 |
| $ZrO_2$ | 600.0 | 27.5 |
| Total | 3,000.0 | 100.0 |

The components listed are used in their chemically pure forms, and are ground to fine powders, having particle diameters of a few microns, in a ball-mill, or by any other conventional means.

In the case of the foregoing mixtures, and any of the other mixtures which will be set forth hereinafter, it is preferable to precalcine the components by heating them up in a closed refractory vessel. The vessel carrying the materials to be calcined, which is of such composition that it does not react chemically with the components of the mixture at the calcining temperature, is enclosed in a second refractory vessel in which is placed lead oxide, lead fluoride, lead chloride, or some other compound of lead, or combination of lead compounds which volatilize at the calcining temperature to produce an excess of vapor, thereof which approximates the vapor pressure of the materials being calcined, thereby preventing volatilization of the lead oxide from the calcined mix. Calcining is carried out at temperatures ranging from 1,000 to 1,500 degrees Fahrenheit, the peak temperatures being maintained for periods ranging from a few minutes to several hours.

In the specific example under description, the components of Mix I were placed in a first closed rectangular vessel of hard-burned fire-clay having dimensions of 11 by 11 by 5 inches. This was placed in a second closed refractory vessel of the same material, having dimensions of 14 by 14 by 8 inches, in which latter container was placed about 2 kilograms of $Pb_2O_3$. This assemblage was then heated up to 1200 degrees Fahrenheit and maintained at the peak temperature for a half hour.

The advantage of calcining lies in the fact that it intimately ties down the volatile materials in the final composition, so preventing excessive volatilization in air-firing of the final parts, eliminating excessive shrinkage, and in general making raw materials more easily processed.

After the aforesaid powder has been mixed to homogeneity and calcined, it is preformed by any of the pressing or extrusion techniques well-known in the art, or by combining with water and casting, or by combining with an organic binder to form a slip which is processed in the manner disclosed in detail in my Patent 2,486,410, issued November 1, 1949; or alternatively, in the manner disclosed by Leslie K. Gulton in application Serial Number 615,017, filed October 10, 1956, which issued as Patent No. 2,892,955, dated June 30, 1959. The thin sheets so processed may be cut into disks or wafers. In accordance with the present illustration, such a wafer, having dimensions of, for example, ¾ inch length, half inch width, and about 12 mils thick, is placed in an oven and heated from room temperature, at a rate of about 920 degrees Fahrenheit or 493.3 degrees centigrade per hour, to the firing temperature. The composition specified may be fired at different temperatures over a wide range, extending from about 760 degrees centigrade, or 1400 degrees Fahrenheit, to 1065.5 degrees centigrade, 1950 degrees Fahrenheit, or higher.

At the lower firing temperatures, the heat-treatment is carried out in air or in PbO vapor, while at the higher temperatures, beginning at 800 degrees centigrade (1472 degrees Fahrenheit), heat-treatment is carried out in a BbO atmosphere, in a manner described by S. Roberts in the Journal of the American Ceramics Society, volume 33, number 2, page 63 (1950).

The maximum firing temperature is maintained for about one-half hour; and then the elements are allowed to cool, in the oven, to room temperature in about a half hour.

During the course of firing, any binders which have been used in the performing and pressing techniques vaporize, or burn off, leaving the polycrystalline solid solution, into the crystal lattice of which the constituent components have entered substantially in the proportions of the mix.

It will be apparent to those skilled in the art that the exact firing temperature, the firing time, and pressure, in each case, is subject to wide variations, depending on the composition employed and equipment involved.

Although two particular compositions have been described by way of illustration, a range of solid-solutions is contemplated within the scope of the present invention, embracing proportions from about 70 mole percent $PbF_2$, 30 mole percent PbO, to 10 mole percent $PbF_2$, 90 mole percent PbO; the balance of the components consisting substantially of titania $TiO_2$ and/or zirconia $ZrO_2$ in any proportionate combination.

As described in detail in the Leslie K. Gulton Patent No. 2,892,955 supra, so called "red lead," $Pb_3O_4$ can be substituted, in whole or in part, in molar ratio, for the PbO in the present combination. It is also contemplated that $PbO_2$, PbO, and $Pb_3O_4$ can be used in various combinations.

Moreover, it is contemplated that in any of the foregoing solid solutions, up to 10 percent by weight can be replaced by the addition of oxides of cerium, lanthanum, or niobium, or similar rare-earth oxides, titanates, zirconates, and stannates, such as barium titanate, which serve to control the electrical characteristics of the composition, and the position of the Curie point. Also, it will be understood that a small percentage of impurities is inherent in certain of these components in their commercially obtainable forms. For example, zirconia often includes up to two or five percent by weight of hafnium. This is not objectionable for the purposes of the present invention.

Tables I and II list additional mixes which are suitable for the purposes of the present invention. As shown in Table I, the lead losses by vaporization upon firing each of the compositions listed were noted. Those compositions including little or no lead fluoride showed high lead losses.

*Table I*

| | | Number of moles. | Firing temp. | Peak temp. firing time | Remarks |
|---|---|---|---|---|---|
| Mix O | PO | 1.00 | 2,200° F. (1,204.4° C) | 15 minutes | High lead loss noted. |
| | $TiO_2$ | .44 | | | |
| | $ZrO_2$ | .56 | | | |
| Mix A | PbO | .46 | 1,400° F. (760° C.) | do | Very low lead loss noted (nonmeasurable). |
| | $PbF_2$ | .54 | | | |
| | $TiO_2$ | .44 | | | |
| | $ZrO_2$ | .56 | | | |
| Mix B | PbO | 1.00 | 2,200° F. (1204.4° C.) | do | High lead loss noted. |
| | $TiO_2$ | .44 | | | |
| | $ZrO_2$ | .56 | | | |
| | $CeO_2$ | .14 | | | |
| | $La_2O_3$ | .14 | | | |
| Mix C | PbO | .46 | 1,400° F | do | No measurable lead loss. |
| | $PbF_2$ | .54 | | | |
| | $TiO_2$ | .44 | | | |
| | $ZrO_2$ | .56 | | | |
| | $CeO_2$ | .14 | | | |
| | $La_2O_3$ | .14 | | | |

| | Parts by weight | Firing temp. | Peak temp. firing time | Remarks |
|---|---|---|---|---|
| Mix AC | 75, mix A; 225, mix C. | 1,400° F. (760° C.) | 15 minutes | Very low lead loss noted (below experimental error). |
| Mix AC1 | 150, mix A; 150, mix C. | do | do | Do. |
| Mix AC2 | 225, mix A; 75, mix C. | do | do | Do. |
| Mix A2 | 150, mix O; 150, mix A. | 1,600° F. (876.65° C.) | do | Slightly higher lead loss noted. |
| Mix AB1 | 150, mix A; 150, mix B. | do | do | Do. |
| Mix BC2 | 150, mix B; 150, mix C. | do | do | Do. |
| Mix BC3 | 75, mix B; 225, mix C. | 1,800° F. (982.20° C.) | do | Lead loss noted. |
| Mix AB2 | 225, mix A; 75, mix B. | do | do | Do. |
| Mix A1 | 75, mix O; 225, mix C. | do | do | Do. |
| Mix AB | 25, mix A; 225, mix B. | 2,000° F. (1,098.9° C.). | do | Do. |
| Mix BC1 | 225, mix B; 75, mix C. | do | do | Do. |

| | Parts by weight | Firing temp. | Peak temp. firing time | Remarks |
|---|---|---|---|---|
| Mix OA3 | 225, mix O; 75, mix A. | 2,000° F. (1,098.9° C.). | 15 minutes | Lead loss noted. |
| Mix OB3 | 225, mix O; 75, mix B. | 2,200° F. (1,204.4° C.). | do | High lead loss noted. |
| Mix OB2 | 150, mix O; 150, mix B. | do | do | Do. |
| Mix OB1 | 75, mix O; 225, mix B. | do | do | Do. |

*Table II*

ADDITIONAL MIXES

| | Moles |
|---|---|
| Mix D | PbO, .46; $PbF_2$, .54; $TiO_2$, 1.00. |
| Mix E | PbO, .46; $PbF_2$, .54; $TiO_2$, .50; $ZrO_2$, .50. |
| | **Percent by weight** |
| Mix F | .47, Mix D; .53, Mix E. |
| Mix G | .46, Mix D; .54, Mix E. |
| Mix H | .45, Mix D; .55, Mix E. |
| Mix I | .44, Mix D; .56, Mix E. |
| Mix J | .43, Mix D; .57, Mix E. |
| Mix K | .42, Mix D; .58, Mix E. |
| Mix J1 | .50, Mix D; .50, Mix E. |
| Mix K1 | .40, Mix D; .60, Mix E. |

After the firing and cooling treatment has been completed, electrodes 2 and 3 are applied to opposite surfaces of the body 1 in any manner well-known in the art and fired below the firing temperature of the ceramic body. However, because of the low temperatures involved in the firing of compositions in accordance with the present invention, it is contemplated that foil electrodes of silver, or other suitable meal, and of any desired thickness, such as for example, a few mils, can be conveniently bonded to the surfaces of the ceramic body 1 during the firing operation. Moreover, any of the conventional types of electrodes well-known in the art, such as, for example, evaporated electrodes of silver, platinum, or the like, or coatings of ceramic-silver, ceramic-platinum or similar combinations, may be used for the purposes of the present invention.

Terminals and leads 4 and 5 are respectively soldered to opposite electrodes 2 and 3.

The transducer so formed is then polarized in a manner well-known in the art by heating the body up to above the Curie temperature, and then allowing it to cool to a temperature below the Curie temperature, which in the present illustrative embodiments is between about 250 and 450 degrees centigrade.

About 330 to 150 volts per mil thickness of the ceramic body 1 is applied across the terminals 3 and 4 for a period up to about an hour. Charging may start at above the Curie point, but it is preferable to quench the material to a temperature at which there is a low loss and high insulation resistance, at which point charging is applied. This has the advantage over charging thru the Curie point of limiting the amount of interfacial polarization and/or ion migration in the material, which is deleterious in nature. After polarization of the rectangular wafer of the present example (which was fired at 1400 degree Fahrenheit) and after aging for a period of about two days, the following electromechanical coupling coefficients were measured: $k_L$ 27.7 percent; $k_W$ 24.7 percent, and $k_T$ 30.4 percent, where the latter respectively represent the length, width, and thickness-mode vibrations. At 450 degrees Fahrenheit, the resistance of the body between electrodes measured about 30,000 megohms, per cube.

The dielectric characteristic of ceramic bodies of the preferred composition set forth in Mix I, cured at each of five different temperatures, were further tested by applying a field of 60 cycle alternating current of about 3 volts per mil across the terminals 4 and 5, and raising the temperature of the subject transducer, in each case, at atmospheric pressure, from about 25 degrees centigrade to nearly 450 degrees centigrade, above the Curie point in each case, and recording, at each step, values of the dielectric constant, and the tangent of the loss angle. These values are plotted in FIGURES 2, 3, 4, 5, 6 and 7, the curing temperature being indicated on the respective figure, in each case. The last two FIGURES, 6 and 7, show the test results of a body, before and after polarization, when cured at a low firing temperature of 760 degrees centigrade (1400 degrees Fahrenheit). It is apparent that polarization makes little difference in the dielectric constant and loss characteristics, particularly in the low temperature range.

It is apparent that for each of the compositions the losses are very uniform over a range extending from room temperature to temperatures above 200 degrees centigrade. Moreover, in the case of the body indicated in FIGURE 5, the dielectric constant is seen to be substantially constant over a range extending from room temperature to above 100 degrees centigrade; and the loss tangent is nearly negligible within this range. These features are of special interest for numerous practical applications, in which the ceramic body is subject to a wide range of temperature variations.

Such uniform behavior over a wide range of temperatures is not inherent in compositions consisting essentially of barium titanate, because of their much lower Curie temperatures.

It will be apparent that elements formed in accordance with the present invention may be utilized in numerous different types of ferroelectric and piezoelectric applications, and for other electrical applications, such as condensers and delay lines. Moreover, the scope of the present invention is not to be construed as limited to any specific form or arrangement disclosed herein by way of illustration, or to any of the specifically disclosed compositions.

What I claim is:

1. An electrical circuit element comprising a ceramic body consisting essentially of a solid solution of lead oxide, lead fluoride, and at least one crystalline compound selected from the group consisting of titania and zirconia, wherein the ratio of lead oxide to lead fluoride varies over the range of combinations from substantially 30 mole percent PbO, 70 mole percent $PbF_2$ to 90 mole percent PbO, 10 mole percent $PbF_2$, and wherein the solid solution of lead oxide and lead fluoride is 100 mole percent and the crystalline compound is 100 mole percent.

2. An electrical transducer comprising in combination a solid dielectric body, electrode means coupled to opposing surfaces of said body, wherein said body consists essentially of a solid solution of lead oxide, lead fluoride, and at least one crystalline compound selected from the group consisting of titania and zirconia, wherein the ratio of lead oxide to lead fluoride varies over the range of combinations from substantially 30 mole percent PbO, 70 mole percent $PbF_2$ to 90 mole percent PbO, 10 mole percent $PbF_2$, and wherein the solid solution of lead oxide and lead fluoride is 100 mole percent and the crystalline compound is 100 mole percent.

3. An electrical circuit element comprising in combination a ceramic body, and a pair of metal foil electrodes thermally bonded to said body, wherein said body comprises a solid solution consisting essentially of lead oxide, lead fluoride, and at least one crystalline compound selected from the group consisting of titania, and zirconia, wherein the ratio of lead oxide to lead fluoride varies over the range of combinations from substantially 30 mole percent PbO, 70 mole percent $PbF_2$ to 90 mole percent PbO, 10 mole percent $PbF_2$, said combination of lead fluoride and lead oxide being 100 mole percent and said crystalline compound being 100 mole percent.

4. A ceramic crystalline body which consitsts essentially of a solid solution of lead oxide, PbO, lead fluoride $PbF_2$ and at least one of the compounds titania $TiO_2$ and zirconia $ZrO_2$, wherein the proportion of lead oxide to lead fluoride varies over the range of combinations from about 30 mole percent PbO, 70 mole percent $PbF_2$, to 90 mole percent PbO, 10 mole percent $PbF_2$, wherein the lead oxide and lead fluoride together are 100 mole percent and the titania and zirconia together are 100 mole percent.

5. A solid crystalline body in accordance with claim 4 to which up to 10 percent by weight has been added of at least one compound selected from the group consisting of barium titanate, lead titanate, lead zirconate, and oxides of cerium, lanthanum and niobium.

6. An electrical circuit element comprising in combination a dielectric body which is a solid solution consisting of between 20 and 35 mole percent of each of lead oxide PbO, and lead fluoride $PbF_2$, with the balance selected from the group consisting of one of the compounds titania and zirconia, wherein the total mole percent of the combined lead oxide and lead fluoride is equal to the total mole percent of the group consisting of one of the compounds titania and zirconia.

7. An electrical circuit element comprising a solid solution consisting of between 20 and 35 mole percent of each of the following compounds: lead oxide PbO, lead fluoride $PbF_2$, titania $TiO_2$, and zirconia $ZrO_2$ such that the combined mole percent of lead oxide and lead fluoride is 100 and the combined mole percent of titania and zirconia is 100.

8. A combination in accordance with claim 7 to which up to 10 percent by weight has been added of at least one compound selected from the group consisting of barium titanate, lead titanate, lead zirconate, and oxides of cerium, lanthanum and niobium.

9. An electrical circuit element comprising in combination a ceramic body which is a solid solution consisting essentially of between 20 and 35 mole percent of each of lead oxide and lead fluoride with the balance selected from the group of compounds consisting of titania and zirconia, said solution including not more than 10 percent by weight of adulterating impurities, and a pair of electrodes coupled to said body, wherein the lead oxide and lead fluoride together are 100 mole percent and the balance from theg roup of compounds consisting of titania and zirconia is 100 mole percent.

10. A ceramic body comprising a solid solution formed from a mix consisting essentially of about 9 mole percent $Pb_3O_4$, 32 mole percent $PbF_2$, 27 mole percent $TiO_2$, and 32 mole percent $ZrO_2$.

11. A ceramic body comprising a solid solution consisting essentially of 23 mole percent PbO, 27 mole percent $PbF_2$, 22 mole percent $TiO_2$, and 28 mole percent $ZrO_2$.

12. A ceramic body in accordance with claim 11 in which up to about 10 percent by weight of at least one compound selected from the group consisting of barium titanate, lead titanate, lead zirconate, and oxides of cerium, lanthanum and niobium is added to said solid solution.

13. In forming a ceramic body consisting of a substantial proportion of lead oxide in combination with a compound selected from the group consisting of titania and zirconia, the method of reducing the lead vapor loss which normally occurs when said body is fired to maturity which comprises adding to the said body amounts of lead fluoride wherein the ratio of lead oxide to lead fluoride varies over the range of combinations from substantially 30 mole percent lead oxide, 70 mole percent lead fluoride to 90 mole percent lead oxide, 10 mole percent lead fluoride, and wherein the total mole percent of the combined lead oxide and lead fluoride is equal to the total mole percent of the compound selected from the group consisting of titania and zirconia, and then firing said body to maturity.

14. The method of forming a ceramic body which comprises a mixture consisting essentially of a solid solution of lead oxide PbO and lead fluoride $PbF_2$ wherein the ratio of lead oxide to lead fluoride varies over the range of combinations from substantially 30 mole percent lead oxide, 70 mole percent lead fluoride to 90 mole percent lead oxide, 10 mole percent lead fluoride, and a balance of material consisting essentially of one of the compounds titania and zirconia wherein the total mole percent of the combined lead oxide and lead fluoride is equal to the total mole percent of one of the compounds titania and zirconia, placing the said mixture in a first refractory vessel which is chemically inert to the materials of said mixture, sealing the said first refractory vessel within a second refractory vessel in which is disposed a quantity of a material comprising at least one compound selected from the group consisting of the oxides and halides of lead which volatilize at temperatures within the range 1000 to 1500 degrees Fahrenheit to produce an atmosphere in which the vapor pressure approximately equals the vapor pressure of the material being calcined within the said temperature range, heating the assemblage including said first refractory vessel within said second refractory vessel to a temperature within the said temperature range for a period of from a few minutes to several hours, cooling the said mixture to room temperature, grinding the said mixture with a binder, processing the said mixture to form typical ceramic shapes, firing the said shapes to maturity by heating them in an oven to a temperature of at least about 1400 degrees Fahrenheit for about a half-hour, and allowing said shapes to cool to room temperature in said oven for about half an hour.

References Cited in the file of this patent

UNITED STATES PATENTS

| | | |
|---|---|---|
| 2,424,111 | Mavias | July 15, 1947 |
| 2,729,757 | Goodman | Jan. 3, 1956 |
| 2,892,955 | Gulton | June 30, 1959 |

FOREIGN PATENTS

| | | |
|---|---|---|
| 1,062,238 | France | Dec. 2, 1953 |

OTHER REFERENCES

Jaffe et al.: "Properties of Piezoelectric Ceramics in the Solid-Solution Series Lead Titanate-Lead Zirconate-Lead Oxide: Tin Oxide and Lead Titanate-Lead Hafnate," J. of Research of the National Bureau of Standards, vol. 55, No. 5, Nov. 1955, Research Paper 2626, pages 239–254.